(12) United States Patent
Cimadamore et al.

(10) Patent No.: US 11,875,168 B2
(45) Date of Patent: *Jan. 16, 2024

(54) OPTIMIZING EXECUTION OF FOREIGN METHOD HANDLES ON A VIRTUAL MACHINE

(71) Applicant: Oracle International Corporation, Redwood Shores, CA (US)

(72) Inventors: Maurizio Cimadamore, Donabate (IE); James Malcolm Laskey, Lunenburg (CA); Jorn Bender Vernee, Leiden (NL); Vladimir Vitalyevich Ivanov, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 233 days.

This patent is subject to a terminal disclaimer.

(21) Appl. No.: 17/176,824

(22) Filed: Feb. 16, 2021

(65) Prior Publication Data

US 2021/0294626 A1 Sep. 23, 2021

Related U.S. Application Data

(60) Provisional application No. 62/992,014, filed on Mar. 19, 2020.

(51) Int. Cl.
 *G06F 9/455* (2018.01)
 *G06F 9/448* (2018.01)

(52) U.S. Cl.
 CPC .......... *G06F 9/45525* (2013.01); *G06F 9/449* (2018.02); *G06F 9/45558* (2013.01);
 (Continued)

(58) Field of Classification Search
 CPC .. G06F 9/45525; G06F 9/449; G06F 9/45558; G06F 2009/45583; G06F 9/4488; G06F 2009/45579; G06F 2009/45595
 See application file for complete search history.

(56) References Cited

U.S. PATENT DOCUMENTS 5,319,760 A 6/1994 Mason et al.
5,537,592 A 7/1996 King et al.
(Continued)

FOREIGN PATENT DOCUMENTS

| WO | 01/90885 A2 | 11/2001 |
| WO | 2006/131695 A1 | 12/2006 |
| WO | 2020/192667 A1 | 10/2020 |

OTHER PUBLICATIONS

B. Wong, G. Czajkowski and L. Daynes, "Dynamically loaded classes as shared libraries: an approach to improving virtual machine scalability," Proceedings International Parallel and Distributed Processing Symposium, 2003, pp. 10 pp.-, doi: 10.1109/IPDPS .2003. 1213123. (Year: 2003).

(Continued)

*Primary Examiner* — Michael W Ayers
(74) *Attorney, Agent, or Firm* — Invoke

(57) ABSTRACT

Techniques for reducing overhead in native function calls are disclosed. The system may receive a method invocation instruction for invoking a particular method. The method invocation instruction includes a function descriptor, a method type, and an application binary interface (ABI) descriptor. The function descriptor includes a memory layout corresponding to any data returned by the function and memory layouts corresponding to each argument for the particular method. The system can select an ABI for processing the particular method based on the received ABI descriptor. The system can further associate each argument with a corresponding particular physical register into which the argument is to be loaded. The particular register is selected based on at least the selected ABI and the function descriptor. The system can cause a virtual machine to move each argument into the corresponding associated physical register.

20 Claims, 13 Drawing Sheets

(52) U.S. Cl.
CPC .. *G06F 9/4488* (2018.02); *G06F 2009/45579* (2013.01); *G06F 2009/45583* (2013.01); *G06F 2009/45595* (2013.01)

(56) References Cited

U.S. PATENT DOCUMENTS

| | | | |
|---|---|---|---|
| 5,946,713 A | | 8/1999 | Hacking et al. |
| 5,991,856 A | | 11/1999 | Spilo et al. |
| 6,066,181 A | | 5/2000 | Demaster |
| 6,237,110 B1 | | 5/2001 | Lin et al. |
| 6,446,034 B1 | | 9/2002 | Egolf |
| 6,481,006 B1 | | 11/2002 | Blandy et al. |
| 6,658,421 B1 | * | 12/2003 | Seshadri ............... G06F 9/4488 707/999.1 |
| 7,360,206 B1 | | 4/2008 | Hatcher |
| 8,209,510 B1 | | 6/2012 | Thathapudi et al. |
| 10,884,764 B1 | * | 1/2021 | Pilkington .......... G06F 9/45508 |
| 11,221,951 B1 | | 1/2022 | Abhishek et al. |
| 11,354,165 B1 | | 6/2022 | Li et al. |
| 2002/0144077 A1 | | 10/2002 | Andersson et al. |
| 2002/0147916 A1 | | 10/2002 | Strongin et al. |
| 2003/0126398 A1 | | 7/2003 | Shinozaki |
| 2006/0005177 A1 | | 1/2006 | Atkin et al. |
| 2006/0195626 A1 | | 8/2006 | Arndt et al. |
| 2007/0005911 A1 | | 1/2007 | Yang et al. |
| 2007/0288682 A1 | | 12/2007 | Czajkowski et al. |
| 2008/0046997 A1 | | 2/2008 | Wang |
| 2008/0209578 A1 | | 8/2008 | Ghetie |
| 2009/0089531 A1 | | 4/2009 | Johnson et al. |
| 2010/0192124 A1 | * | 7/2010 | Hall ........................ G06F 8/30 717/106 |
| 2012/0047343 A1 | | 2/2012 | Farrell et al. |
| 2012/0047495 A1 | * | 2/2012 | Meijer ................... G06F 8/314 712/220 |
| 2012/0210095 A1 | | 8/2012 | Nellans et al. |
| 2012/0233378 A1 | | 9/2012 | Elteto |
| 2013/0132698 A1 | | 5/2013 | Huang |
| 2014/0033304 A1 | | 1/2014 | Lewis |
| 2014/0075136 A1 | | 3/2014 | Davies |
| 2014/0280756 A1 | * | 9/2014 | Maity .................. H04L 67/131 709/219 |
| 2015/0006962 A1 | | 1/2015 | Swanson et al. |
| 2015/0089178 A1 | | 3/2015 | Furdui |
| 2015/0149592 A1 | | 5/2015 | Gibbon et al. |
| 2015/0205632 A1 | * | 7/2015 | Gaster .................. G06F 9/4843 718/102 |
| 2015/0234679 A1 | * | 8/2015 | Moyer .................. G06F 9/4856 718/108 |
| 2015/0268960 A1 | * | 9/2015 | Knox ..................... G06F 8/443 712/220 |
| 2016/0085687 A1 | | 3/2016 | Baruch et al. |
| 2016/0274792 A1 | | 9/2016 | Ogawa |
| 2017/0115975 A1 | | 4/2017 | Rose et al. |
| 2017/0116017 A1 | | 4/2017 | Rose et al. |
| 2018/0131751 A1 | * | 5/2018 | Jones ..................... H04L 67/01 |
| 2018/0189086 A1 | * | 7/2018 | Queva ...................... G06F 8/49 |
| 2020/0409734 A1 | | 12/2020 | Sahita et al. |
| 2021/0263779 A1 | * | 8/2021 | Haghighat ............ G06F 9/5061 |
| 2021/0334019 A1 | | 10/2021 | Grisenthwaite et al. |

OTHER PUBLICATIONS

J. Roney, T. Appel, P. Pinisetti and J. Mickens, "Identifying Valuable Pointers in Heap Data," 2021 IEEE Security and Privacy Workshops (SPW), 2021, pp. 373-382, doi: 10.1109/SPW53761.2021.00057. (Year: 2021).

M. Cesati, R. Mancuso, E. Betti and M. Caccamo, "A Memory Access Detection Methodology for Accurate Workload Characterization," 2015 IEEE 21st International Conference on Embedded and Real-Time Computing Systems and Applications, 2015, pp. 141-148, doi: 10.1109/RTCSA.2015.30. (Year: 2015).

Application Binary Interface, Wikipedia, 2017, 4 pages, [retrieved on Feb. 12, 2022], Retrieved from the Internet: <URL:https://web.archive.org/web/20170307083910/https://en.wikipedia.org/wiki/Application_binary_interface>.

Java Native Interface, Wikipedia, 2017, 5 pages, [retrieved on Feb. 12, 2022], Retrieved from the Internet: <URL:https://web.archive.org/web/20170325020302/https://en.wikipedia.org/wiki/Java_Native_Interface>.

Thalinger, C., et al., Optimizing Invokedynamic, PPPJ '10: Proceedings of the 8th International Conference on the Principles and Practice of Programming in Java, Sep. 2010, pp. 1-9, [retrieved on Feb. 12, 2022], Retrieved from the Internet: <URL:http://dl.acm.org/>.

* cited by examiner

OPTIMIZING EXECUTION OF FOREIGN METHOD HANDLES ON A VIRTUAL MACHINE

INCORPORATION BY REFERENCE; DISCLAIMER

This application is hereby incorporated by reference: application No. 62/992,014 filed on Mar. 19, 2020. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to executing foreign methods. In particular, the present disclosure relates to optimizing execution of foreign method handles when invoked using a MethodHandle object.

BACKGROUND

While Java is a powerful programming language, there may be times when a user desires to write code in different languages. For example, if the user wishes to utilize a platform specific feature that is not supported in the standard Java class library, or if the user wishes to utilize a function that has already been written in another programming language.

The Java Native Interface (JNI) is a foreign function interface programming framework that enables Java code running in a Java virtual machine (JVM) to call and be called by native applications (programs specific to a hardware and operating system platform) and libraries written in C, C++, or assembly. In the JNI framework, native functions are implemented in separate files. When the JVM invokes a native function, it passes any Java arguments declared by the Java method.

However, JNI requires that the source code include a static declaration of the native function. Accordingly, each native function must be separately declared statically and compiled to create a header filed associated with the native function. Finally, a separate native file is needed for converting the java arguments to arguments usable by the native function. Accordingly, using JNI requires that the user have knowledge of the native language in order to implement the native function call. Further, JNI only works well with native data types (e.g., an integer, long, char, string, and the like). In particular, JNI does not work well with struct or pointer arguments.

Native functions may also be implemented using a MethodHandle object. If a MethodHandle object is used to invoke a native function, arguments may be passed from the Java code to the native function via a buffer invocation mode, in which a buffer is created, each of the Java arguments passed to the native function are inserted into the buffer. The arguments are moved into the buffer using Java code, and a specialized assembly routine moves the arguments from the buffer into machine registers. The arguments are then removed from the buffer and stored in particular registers associated with the CPU for use in the native function. Using an intermediate buffer like this allows for invoking many different native functions through the same generic protocol. Each Java argument is placed at a particular offset in the buffer, and the assembly routine moves values from the particular offset into a particular machine register. This means there is an effective mapping from buffer offset to machine register, and the use of an assembly routine allows for movement of Java values into machine registers, which is not possible using only the Java language.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
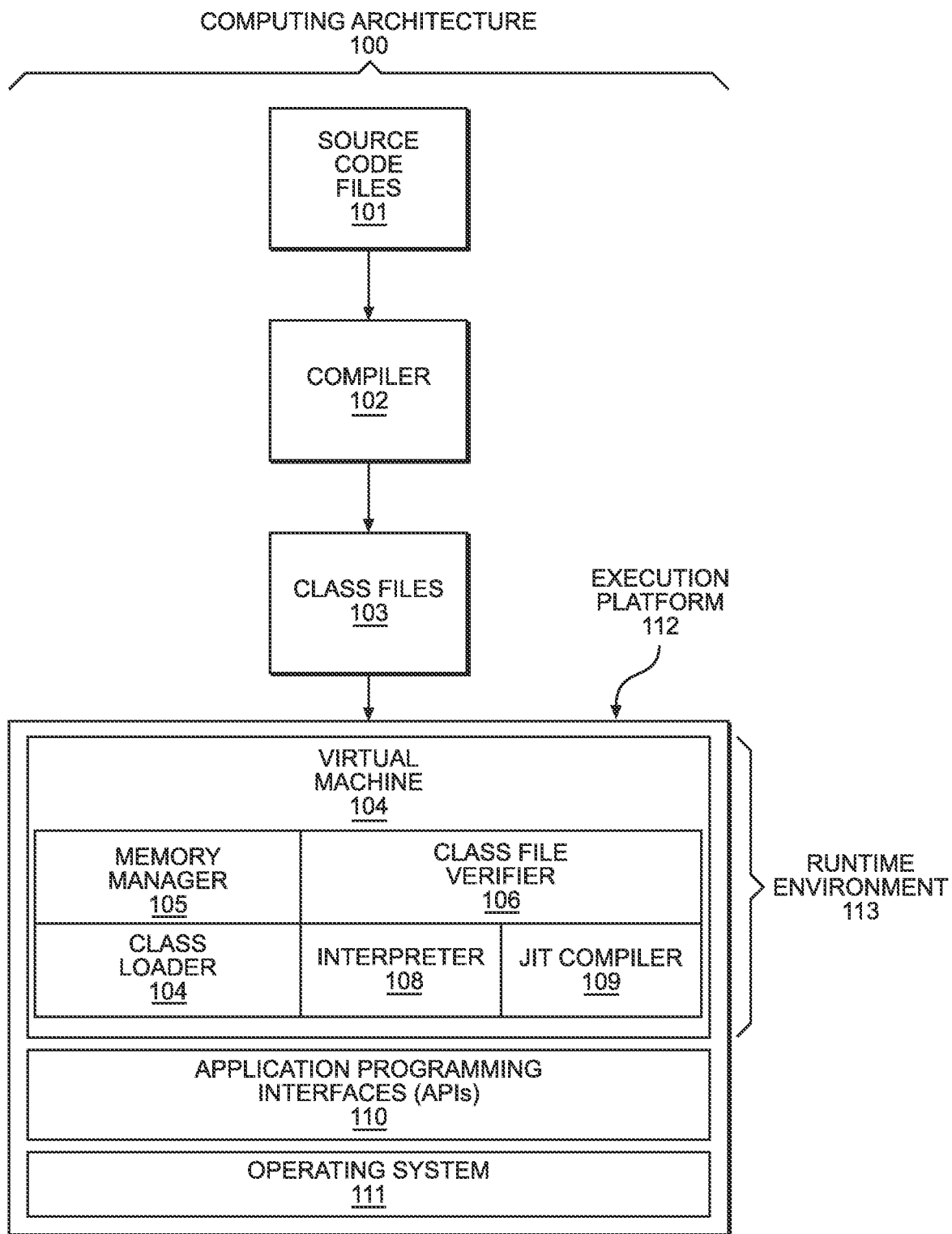
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. LINKING FUNCTIONS AND METHODS
   3.1 LINKING A NATIVE FUNCTION
   3.2 LINKING A METHOD
   3.3 EXECUTION PLAN
   3.4 OPERAND STACK
   3.5 BINDING OPERATORS
   3.6 BINDING A NATIVE FUNCTION
4. EXECUTING A NATIVE FUNCTION USING AN EXECUTABLE REFERENCE
   4.1 SELECTING AN EXECUTION STRATEGY
   4.2 GENERALIZED EXECUTION STRATEGY
   4.3 SPECIALIZED EXECUTION STRATEGY
5. EXECUTING A METHOD LINKED TO A NATIVE FUNCTION
   5.1 SELECTING AN EXECUTION STRATEGY
   5.2 GENERALIZED EXECUTION STRATEGY
   5.3 SPECIALIZED EXECUTION STRATEGY
6. MISCELLANEOUS; EXTENSIONS
7. HARDWARE OVERVIEW

1. GENERAL OVERVIEW

One or more embodiments include a method for helping to reduce overhead when invoking native functions using an executable reference (e.g., a MethodHandle object). A MethodHandle object serves as a typed, directly executable reference to an underlying method, constructor, field, or similar low-level operation, with optional transformations of arguments or return values. A MethodHandle may include one or more invoker methods that provide direct access to the underlying method, constructor, field, or other operation. The invokers accept calls which exactly match the type of the MethodHandle.

In an embodiment, the system uses a reduced overhead methodology to process the invocation instruction, when compared to a buffer invocation method. In particular, the reduced overhead processing methodology includes storing arguments for native functions directly into physical registers of the system from the memory accessible by the virtual machine. Storing the arguments directly into physical registers, rather than allocating an intermediate buffer for temporarily storing the arguments for loading into the physical registers, reduces processing overhead. The system may implement instructions based on a function descriptor object associated with the native function and supplied at the time the java application is executed, and an Application Binary Interface (ABI) associated with a language in which the native function is written to move arguments directly into the registers associated with the CPU, obviating the need for creation of a buffer, and positioning the arguments within the buffer.

In some embodiments, preprocessing of the arguments may be used to convert the Java arguments to arguments for use by the native function. The preprocessing steps may be determined based on the function descriptor and the ABI. In some aspects, the preprocessing may be implemented serially for each argument, and the preprocessing actions may be selected from a finite group of actions. While preprocessing may increase the processing overhead for a single invocation of a method, the preprocessing may reduce the total processing overhead for multiple invocations of the method.

One or more embodiments described in this Specification and/or recited in the claims may not be included in this General Overview section.

2. ARCHITECTURAL OVERVIEW

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
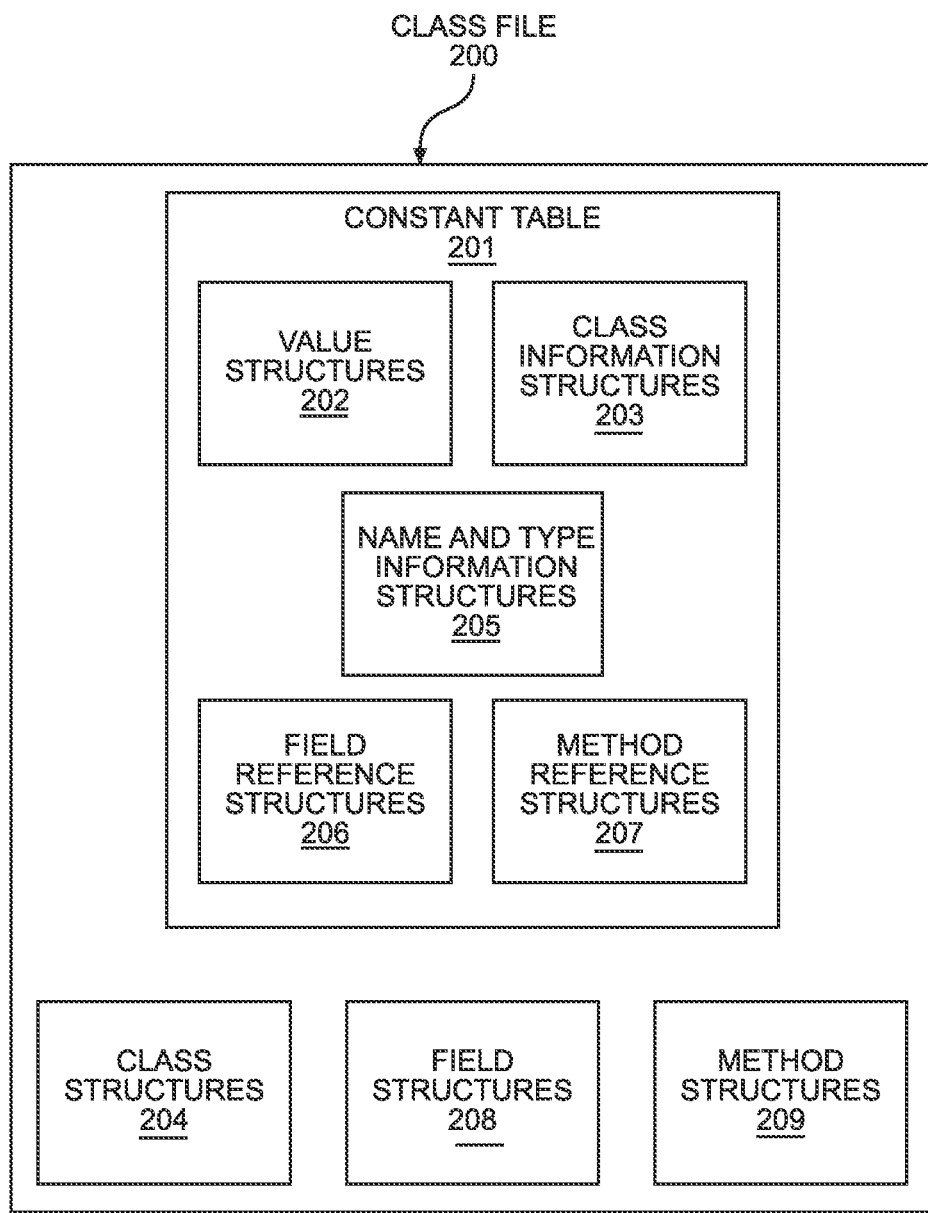
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { ... }" matches the descriptor "(I D L Thread) L Object".

In an embodiment, the virtual machine instructions held in the method structures 209 include operations which reference entries of the constant table 201. Using Java as an example, consider the following class:

class A
{
   int add12and13 ( ) {
      return B.addTwo(12, 13);
   }
}

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
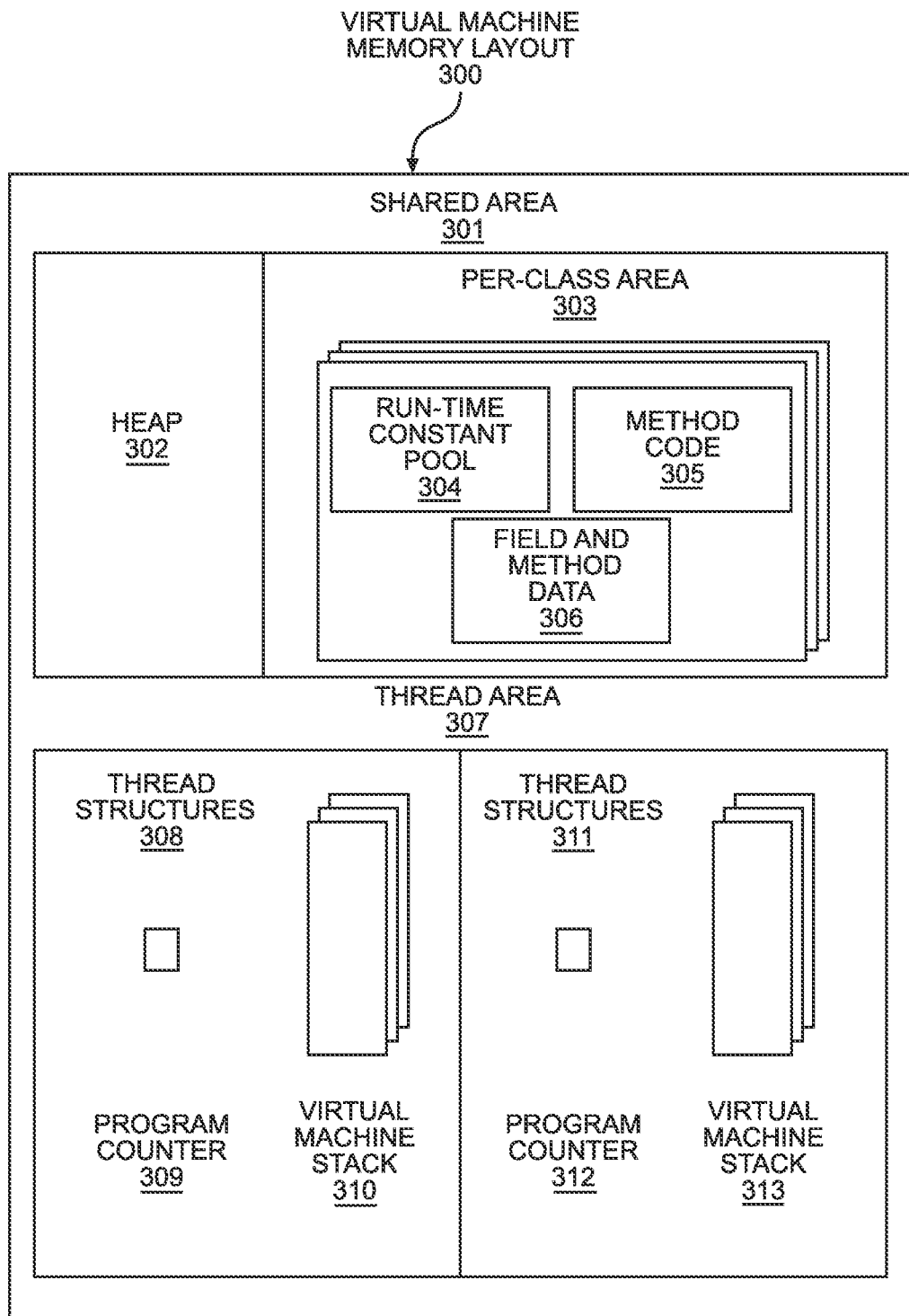
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas be contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per class area 303 represents the memory area where the data pertaining to the individual classes are stored. In an embodiment, the per-class area 303 includes, for each loaded class, a run-time constant pool 304 representing data from the constant table 201 of the class, field, and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
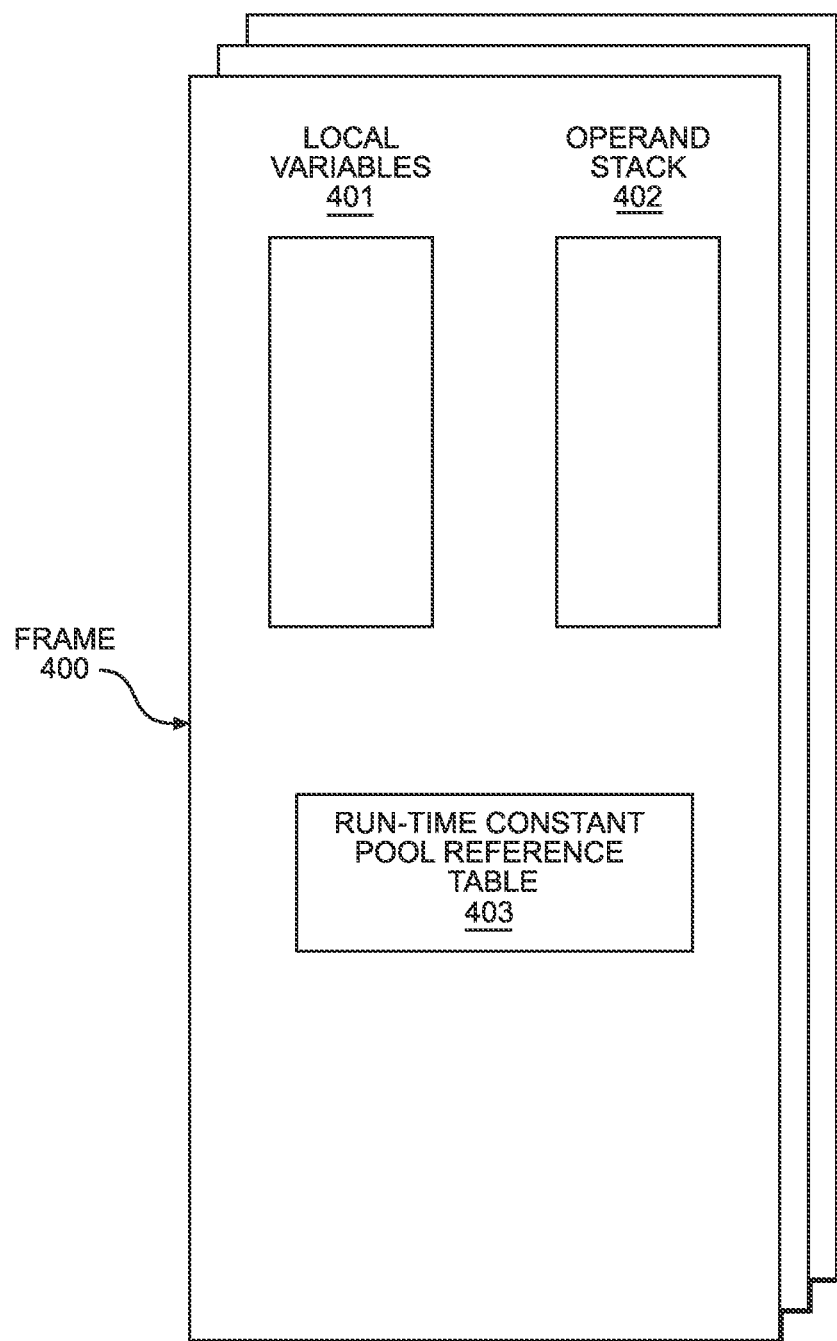
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking, and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3 LINKING FUNCTIONS AND METHODS

Users programming in a first programming language may wish to use existing code in a second language rather than re-creating the functionality of the existing code in the first language. Accordingly, a user may seek to link functions in a first language to methods implemented in a second language. For example, a native function implemented in a first programming language (e.g., C, C++, Pascal, etc.) can be linked to a method implemented in a second programming language (e.g., Java). The linking can allow the native function to be invoked via the method. Alternatively, the linking can allow the method to be invoked by the native function. In particular, this linking can allow native functions to invoke a Java method.

3.1 Linking a Native Function

Figure 5:
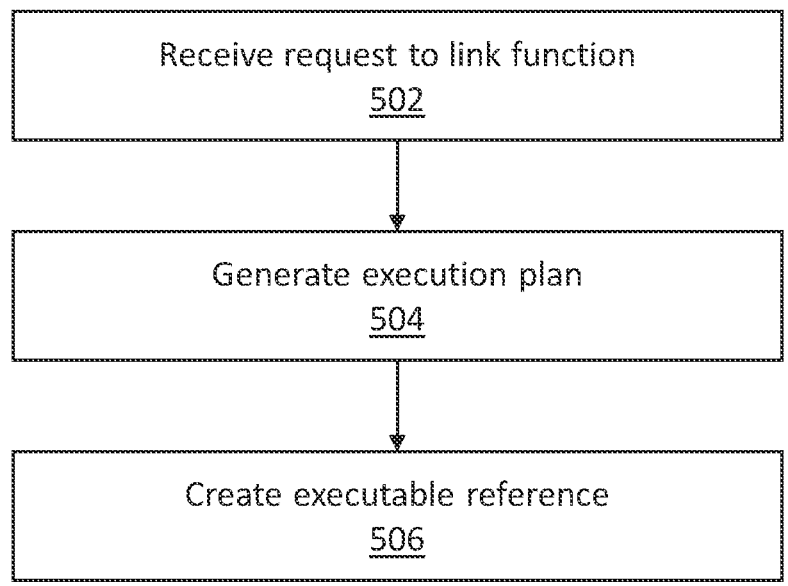
FIG. 5 illustrates a set of operations for linking a native function in accordance with one or more embodiments.

A native function implemented in a first programming language (e.g., C, C++, Pascal, etc.) can be linked to a method implemented in a second programming language (e.g., Java). The linking can allow the native function to be invoked via the method. In particular, this linking can allow native functions to be invoked through a Java method. FIG. 5 illustrates a flowchart showing techniques for linking a native function using an executable reference (e.g., a MethodHandle object). One or more operations illustrated in FIG. 5 may be modified, rearranged, or omitted all together.

Accordingly, the particular sequence of operations illustrated in FIG. 5 should not be construed as limiting the scope of one or more embodiments.

In embodiments, the system receives a request to link a native function (Operation 502). In particular, the request to link the native function may take the form of a request to obtain an executable reference (e.g., a MethodHandle object) for a native function. The request may include a method call that returns an executable reference (e.g., the downcallHandle method).

The request may include, as an argument, a selection of a particular Application Binary Interface (ABI) for use in creating the executable reference. The ABI can be used to define, among other things, a calling convention, which controls how arguments associated with a function are passed and return values are retrieved. As an example, the calling convention can define whether parameters are passed on the stack or are passed in registers, which registers are used for which function parameters, and whether the first function parameter passed on the stack is pushed first or last onto the stack. Additionally, the ABI can be used to define the sizes, layouts, and alignments of basic data types.

The request may include, as an argument, a memory address (e.g., a MemoryAddress object) corresponding to the native function. The memory address can be a memory address corresponding to an entry point into the native function.

The request may include, as an argument, a method type description to be associated with the obtained MethodHandle object (e.g., a MethodType object). The method type includes the types of the arguments and return type accepted and returned by the method handle. The structure of the MethodType object may include a return type and one or more parameter types. The types (e.g., the Java primitive types, void, MemoryAddress, MemorySegment, and reference) may be represented by Class objects.

The request may include, as an argument, a function descriptor that includes a memory layout object that specifies the types and sizes of the return value of the native function and one or more memory layout objects, which each specify the types and sizes of a parameter of the native function. Each memory layout object may include a programmatic description of the return type and/or argument associated with the native function. In some embodiments, the memory layout may define a number of elements to be used by the native function, a number of sub-elements contained in each element, a type of each element, a size of each element, and/or a size of each sub-element. In some aspects, the function descriptor may be used to define one or more memory addresses and/or one or more memory segments to be passed to the native function, or to be returned by the native function.

The system may generate an execution plan (Operation 504). In embodiments, the execution plan is generated based on the received request to link the native function. In particular, the execution plan may be created based on at least the ABI, the method type, and the function descriptor. Generating the execution plan is discussed in greater detail below.

The system may create an executable reference (e.g., a MethodHandle object) in response to the received request to link the native function (Operation 506). The executable reference may include a reference to the execution plan and the memory address of the native function.

3.2 Linking a Method

A native function implemented in a first programming language (e.g., C, C++, Pascal, etc.) may use a method implemented in a second programming language (e.g., Java) via linking. The linking can allow the method to be invoked by the native function. In particular, this linking can allow native functions to invoke a Java method. For example, a sorting algorithm implemented as a native function may receive, as data, a pointer to a method that may be used to compare elements in an array or other data structure. Accordingly, it may be desirable to pass, to a native function, a pointer to a java method.

Figure 6:
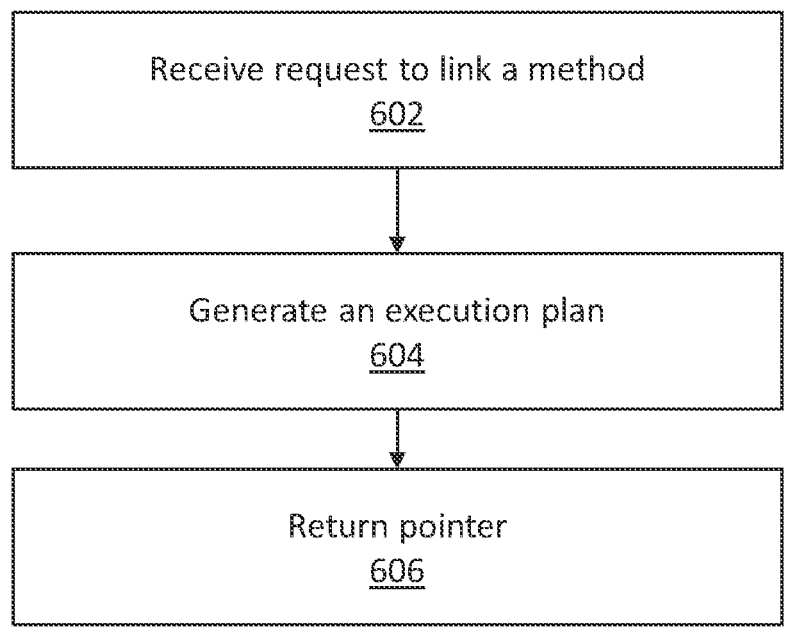
FIG. 6 illustrates a set of operations for linking a method in accordance with one or more embodiments.

FIG. 6 illustrates a flowchart showing techniques for linking a method using an executable reference (e.g., a MethodHandle object). One or more operations illustrated in FIG. 6 may be modified, rearranged, or omitted all together. Accordingly, the particular sequence of operations illustrated in FIG. 6 should not be construed as limiting the scope of one or more embodiments.

In embodiments, the system receives a request to obtain a function pointer (e.g., a MemoryAddress object) for a method (Operation 602). The request may be received in the form of a method call that returns a pointer (e.g., a memory address) to a specified method (e.g., the upcallStub method). The upcallStub method includes, as an argument, a memory address corresponding to the native function. The MemoryAddress may be a memory address corresponding to an entry point into the native function.

The request may include, as an argument, a selection of a particular Application Binary Interface (ABI) for use in creating the executable reference. The ABI can be used to define, among other things, a calling convention, which controls how arguments associated with a function are passed and return values are retrieved. As an example, the calling convention can define whether parameters are passed on the stack or are passed in registers, which registers are used for which function parameters, and whether the first function parameter passed on the stack is pushed first or last onto the stack. Additionally, the ABI can be used to define the sizes, layouts, and alignments of basic data types.

The request may include, as an argument, a MethodHandle associated with the Java method to be executed. In some embodiments, the MethodHandle object includes a method type description (e.g., a MethodType object) including the types of the arguments and return type accepted and returned by the method handle. The structure of the MethodType object may include a return type and one or more parameter types. The types (e.g., the Java primitive types, void, MemoryAddress, MemorySegment, and reference) may be represented by Class objects.

The request may include, as an argument, a function descriptor that includes a memory layout object that specifies the types and sizes of the return value of the native function and one or more memory layout objects, which each specify the types and sizes of a parameter of the native function. Each memory layout object may include a programmatic description of the return type and/or argument associated with the native function. In some embodiments, the memory layout may define a number of elements to be used by the native function, a number of sub-elements contained in each element, a type of each element, a size of each element, and/or a size of each sub-element. In some aspects, the function descriptor may be used to define one or more memory addresses and/or one or more memory segments to be passed to the native function, or to be returned by the native function.

The system may generate an execution plan (Operation 604). In embodiments, the reverse execution plan is generated based on the received request to obtain a function pointer. In particular, the execution plan may be created based on at least the ABI, the method type description, and the function descriptor. Generating the execution plan is described in greater detail below.

The system may return a function pointer (e.g., a MemoryAddress object) that causes execution of at least a portion of the execution plan and the method (Operation 606). In some embodiments, the system may create a function in native code that causes execution of the reverse execution plan and the native method, and may return a function pointer to the created native function.

3.3 Execution Plan

An execution plan is an abstract description of how a native function is to be invoked. In embodiments, the execution plan may include instructions for preprocessing one or more arguments. The execution plan may include instructions for processing a return value of the native function. For example, preprocessing may include splitting or combining values. The execution plan may include one or more argument components. Each argument component of the execution plan can be a list of one or more binding operators associated with a particular argument that is passed to the native function. Each argument component of the execution plan may cause the system to move a value (e.g., the associated particular argument) into one or more storage locations for use by the native function. The storage locations may be machine registers and/or slots in the machine stack. In aspects, the execution plan may include a return component for each return value returned by the native function. Each return component may be a list of one or more binding operators associated with a particular return value. Each return component can cause the system to move one or more values returned by the native function from their particular storage locations (e.g., machine registers and/or slots in the machine stack) to memory locations accessible by the method.

In some embodiments, the system may move data between the memory accessible by the method and the system storage location indirectly. In particular, the system may create an intermediate buffer for use by the execution plan. The intermediate buffer can be mapped to particular storage locations of the system. For example, each system register may correspond to a unique offset within the intermediate buffer. The execution plan may cause the parameters to be stored within the intermediate buffer and/or to read values from the intermediate buffer. Another application (e.g., an assembly program) may be used to move the parameters between the intermediate buffer and the system storage locations. In particular, the intermediate buffer can be used to move data to and from system storage locations for the execution plan.

3.4 Operand Stack

As discussed above, a list of binding operators is created for each argument and each return value of a native function. Each list of binding operators may be executed by an interpreter (e.g., a recipe interpreter). The interpreter may use an operand stack as a data structure for storing intermediate values during execution of the list of binding operators. The operand stack is a stack data structure that may serve as a collection of elements, and operates in a last in first out (LIFO) method, as is known in the art. The operand stack may principally make use of three operations: push, which stores an element to the operand stack; pop, which retrieves the most recently added element that was not yet removed; and peek, which allows access to the most recently added element that was not yet removed without removing the element from the operand stack.

3.5 Binding Operators

Each list of binding operators is compiled from a fixed set of binding operators. The list of binding operators (e.g., a binding recipe) may describe the argument and/or return value processing needed when invoking a native function (or invoking a method using a native function). One example set of binding operators sufficient to describe the processing of substantially all arguments and/or return values is described below. However, those of skill in the art will recognize that additional and/or different binding operators could be used.

As used below, the term unboxing describes the way a binding operator acts when used as part of an argument component in an execution plan for a downcallHandle operation, or when used as part of a return component in an execution plan for an upcallStub operation. Conversely, the term boxing describes the way a binding operator acts when used as part of a return component in an execution plan for a downcallHandle operation, or when used as part of an argument component in an execution plan for an upcallStub operation. In some embodiments, each binding operator has a single function, with some binding operators being more useful during the boxing process, while other binding operators are more useful during the unboxing process. In other embodiments, binding operators may have different functions depending on how they are called. In particular, binding operators may have different boxing functions and unboxing functions.

The virtual machine (VM) store operator may receive, as parameters, a storage location and a type (e.g., a primitive data type). That is, the VM store operator can be represented as VM_STORE(<storage location>, <type>). When the VM store operator is executed (e.g., for either boxing or unboxing), the operator causes the system to pop a value of the specified type from the operand stack and move the value to the specified storage location.

The VM load operator may receive, as parameters, a storage location and a type (e.g., a primitive data type). That is, the VM load operator can be represented as VM_LOAD(<storage location>, <type>). When the VM load operator is executed (e.g., for either boxing or unboxing), the operator causes the system to load a value of the specified type from the specified storage location and push that value to the operand stack.

The buffer store operator may receive, as parameters, an offset into a memory region and a type (e.g., a primitive data type). That is, the buffer store operator may be represented as BUFFER_STORE(<offset into memory region>, <type>). When the buffer store operator is executed (e.g., for either boxing or unboxing), the operator causes the system to pop a MemorySegment from the operand stack, load a value of the specified type from the specified offset into the MemorySegment, and push the MemorySegment to the operand stack.

The buffer load operator may receive, as parameters, an offset into a memory region and a type (e.g., a primitive data type). That is, the buffer load operator may be represented as BUFFER_LOAD(<offset into memory region>, <type>). When the buffer load operator is executed (e.g., for either boxing or unboxing), the operator causes the system to pop a value of the specified type from the operand stack, pop a MemorySegment from the operand stack, and store the popped value to the MemorySegment at the specified offset within the MemorySegment.

The copy operator receives, as parameters, a size and an alignment. That is, the copy operator can be represented as COPY(<size>, <alignment>). When executed (e.g., for either unboxing or boxing), the copy operator causes the system to create a new MemorySegment with the given <size> and <alignment>. The copy operator further causes the system to pop a MemorySegment from the operand stack, copy contents of the retrieved MemorySegment to the newly created MemorySegment, and push the newly created MemorySegment to the operand stack.

The allocate operator receives, as parameters, a size and an alignment. That is, the allocate operator can be represented as ALLOCATE(<size>, <alignment>). When executed (e.g., for either unboxing or boxing), the allocate operator causes the system to create a new MemorySegment based having the specified size and alignment, and push the created MemorySegment to the operand stack.

The unbox address operator does not receive any parameters. That is, the unbox address operator can be represented as UNBOX_ADDRESS( ). When the unbox address operator is executed, the operator causes the system to pop a MemoryAddress from the operand stack, convert the MemoryAddress to a long value, and push the long value to the operand stack.

The box address operator does not receive any parameters. That is, the box address operator can be represented as BOX_ADDRESS( ). When the operator is executed, the box address operator causes the system to pop a long value from the operand stack, convert the retrieved long value to a MemoryAddress, and push the MemoryAddress to the operand stack.

The base address operator does not receive any parameters. That is, the base address operator can be represented as BASE_ADDRESS( ). When executed (e.g., for either unboxing or boxing), the base address operator causes the system to pop a MemoryRegion from the operand stack, determine a base address (e.g., a MemoryAddress that points to the start) of the region, and push the determined MemoryAddress to the operand stack.

The to segment operator receives, as a parameter, a size. That is, the to segment operator can be represented as TO_SEGMENT(<size>). When executed (e.g., for either boxing or unboxing), the operator causes the system to pop a MemoryAddress from the operand stack, converts the MemoryAddress to a MemorySegment having the specified size, and push the MemorySegment to the operand stack.

The duplicate operator does not receive any parameters. That is, the duplicate operator can be represented as DUP ( ). When executed (e.g., for either unboxing or boxing), the duplicate operator causes the system to load a value from the operand stack without retrieving the object from the operand stack (e.g., peek the operand stack), duplicate the peeked value, and push the duplicated value to the operand stack.

In some embodiments, multiple operators that each perform a single function can be replaced by a single operator that performs multiple functions (e.g., the operator may perform different functions depending on whether the operator is used for boxing or unboxing). As a particular example, the VM store and VM load operators may be replaced by a single move operator. As with the VM store and VM load operators, the move operator may receive, as parameters, a storage location and a type (e.g., a primitive data type). When the move operator is executed for unboxing, the operator causes the system to pop a value of the specified type from the operand stack and move the value to the specified storage location. When the move operator is executed for boxing, the operator causes the system to load a value of the specified type from the specified storage location and push that value to the operand stack.

As another example, the buffer store and buffer load operators may be replaced by a single dereference operator. The dereference operator may receive, as parameters, an offset into a memory region and a type (e.g., a primitive data type). When the dereference operator is executed for unboxing, the operator causes the system to pop a MemorySegment from the operand stack, retrieve a value of the specified type from the specified offset of the MemorySegment, and push the MemorySegment to the operand stack. When the dereference operator is executed for unboxing, the operator causes the system to pop a value of the specified type from the operand stack, pop a MemorySegment from the operand stack, and store the popped value to the MemorySegment at the specified offset within the MemorySegment.

As a third example, the unbox address and box address operators can be replaced by a single convert address operator. Like the box address and unbox address operators, the convert address operator does not receive any parameters. When the convert address operator is executed for unboxing, the operator causes the system to pop a MemoryAddress from the operand stack, convert the MemoryAddress to a long value, and push the long value to the operand stack. When the convert address operator is executed for boxing, the operator causes the system to pop a long value from the operand stack, convert the retrieved long value to a MemoryAddress, and push the MemoryAddress to the operand stack.

3.6 Execution of Binding

As discussed above, an execution plan is made up of a list of binding operators for each argument of the native function and a list of binding operators for each return value of a native function. To create the execution plan, the system may use the function descriptor, the method type, and the ABI. That is, the system may inspect the function descriptor and/or the method type to determine a list of any arguments provided to the native function and a list of any return values returned from the native function. For each argument, the system may use the function descriptor, method type, and the ABI to determine one or more binding operators for use in invoking the native function. In particular, the ABI may be used to determine a particular register to which an argument should be stored for use in the function, or a particular register at which a return value is stored upon completing execution of the native function.

In some embodiments, the system can create an intermediate buffer for use by the execution plan. The intermediate buffer can be mapped to a particular storage location of the system. For example, each system register may correspond to a unique offset within the intermediate buffer. The execution plan may cause the parameters to be stored within the intermediate buffer and/or to read values from the intermediate buffer. Another application (e.g., an assembly program) may be used to move the parameters between the intermediate buffer and the system storage locations. In particular, the intermediate buffer can be used to move data to and from system storage locations for the execution plan. For example, each argument component of the execution plan can cause a value received in the method to be positioned at one or more particular locations of the intermediate buffer. The application may be used to move the arguments from the one or more buffer locations to corresponding system storage locations. As another example, a return value of the native function may be moved from the system storage location to a corresponding offset of the intermediate buffer. The return portion of the execution plan may cause the return value to be read from the intermediate buffer to the method.

4. EXECUTING A NATIVE FUNCTION USING AN EXECUTABLE REFERENCE

When an invocation instruction for invoking a native method is executed, the virtual machine may cause execution of the native method by one or more processors associated with the virtual machine. The native function can comprise code written in a programming language that is platform-specific. For example, languages such a C, C++, Pascal, and the like.

4.1 Selecting an Execution Strategy

Figure 7:
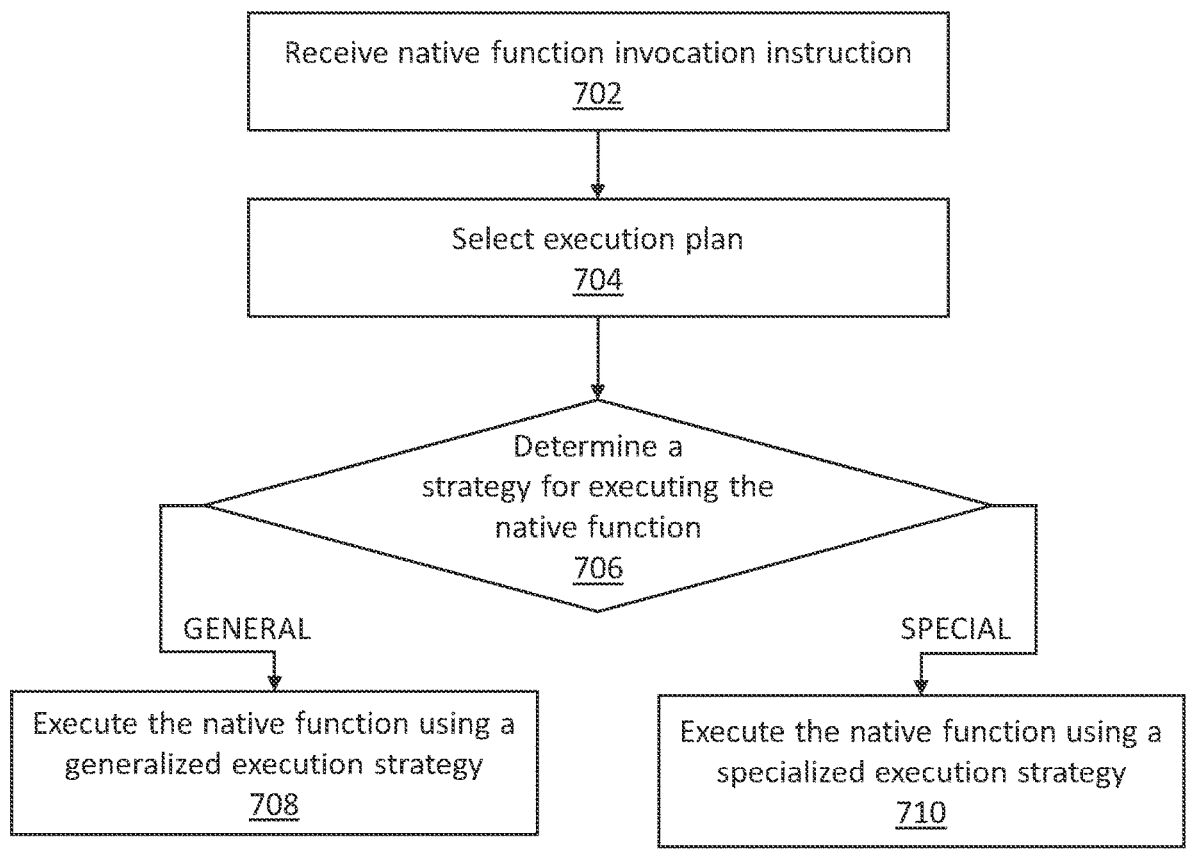
FIG. 7 illustrates a set of operations for selecting an execution strategy for executing a native function using an executable reference in accordance with one or more embodiments.

FIG. 7 illustrates a flowchart showing techniques for selecting an execution strategy for executing a native function using an executable reference (e.g., a MethodHandle object). One or more operations illustrated in FIG. 7 may be modified, rearranged, or omitted all together. Accordingly, the particular sequence of operations illustrated in FIG. 7 should not be construed as limiting the scope of one or more embodiments.

The system may receive an instruction which causes execution of a particular native function (Operation 702). For example, the particular native function may be invoked via an executable reference. In embodiments, the executable reference may include one or more parameters for use in executing the native function. As discussed above, the executable reference may include, among other things, a function descriptor, a method type, an ABI descriptor, and a memory address associated with the native function.

The system may select an execution plan associated with the particular native function (Operation 704). In aspects, the system selects the execution plan on the basis of the function descriptor, the method type, and the ABI descriptor.

The system may determine a strategy for executing the native function (Operation 706). In particular, the system may determine if the native function should be executed by a generalized invocation strategy, or if the native function should be executed by a specialized invocation strategy. One or more criteria may be used to determine the method of execution of the native function.

One criterion determining a strategy for execution of the native function can be a number of times the native function is invoked. For example, the system can determine a number of times that the native function is invoked and compare that to a threshold. In some embodiments, the threshold may be 10, 100, 1000, 10,000, or any other number deemed suitable by the system. The system may determine whether or not the number of times the native function is invoked exceeds the threshold.

Another criterion for determining a strategy for execution of the native function may be constancy of the invocations of the native function. In embodiments, the system determines that the argument types and/or return types of the native function are not changing (e.g., so that the function descriptor, method type, and ABI descriptor are the same in each invocation). For example, the system may detect that the executable reference is immutable (e.g., the executable reference is declared using keywords such as "static" and/or "final"). As another example, the system may detect that the executable reference is invoked as a part of a loop that does not alter the executable reference. In some embodiments an optimizer portion of the system can be used to determine that the MethodHandle is not being modified.

Still another criterion for determining a strategy for execution of the native function may be complexity. That is, the system may determine that one or more features of the native function are not supported by (or are difficult to support using) one execution strategy.

The system may determine the strategy for executing the native function based on one or more of these criteria. Additionally, one of skill in the art may recognize that more or different criteria may be used in determining the method of executing the native function.

If the system determines that the native function should be executed using a generalized execution strategy (GENERAL at Operation 706), the system can invoke the native function by interpreting the binding operators (Operation 708). Alternatively, if the system determines that the native function should be executed using a specialized execution strategy (SPECIAL at Operation 706), the system can invoke the native function by compiling the binding operators into a specialized execution strategy (Operation 710). The compiled specialized execution strategy may be invoked in place of invoking the received executable reference.

4.2 Generalized Execution Strategy

Execution of an invoked native function may be handled in a generalized way by the system. In particular, the system may use an interpreter to interpret the binding operators of the execution plan.

Figure 8:
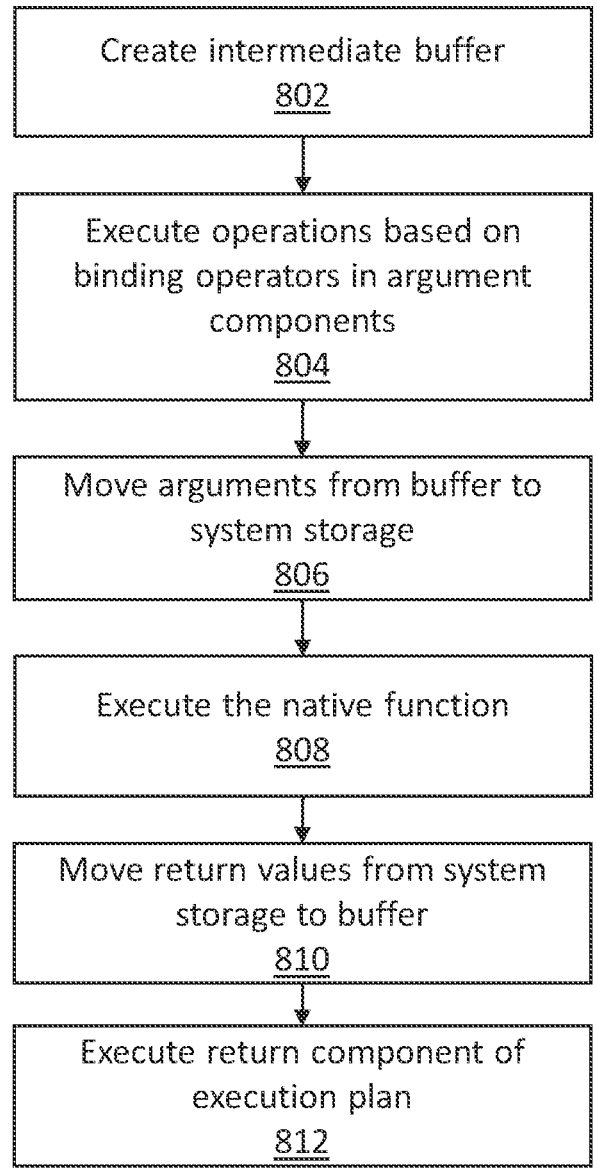
FIG. 8 illustrates a set of operations for a generalized execution strategy for executing a native function using an executable reference in accordance with one or more embodiments.

FIG. 8 illustrates a flowchart showing techniques for a generalized execution strategy for executing a native function using an executable reference (e.g., a MethodHandle object). One or more operations illustrated in FIG. 8 may be modified, rearranged, or omitted all together. Accordingly, the particular sequence of operations illustrated in FIG. 8 should not be construed as limiting the scope of one or more embodiments.

The system may allocate an intermediate buffer for use in marshalling arguments for the native function (Operation 802). As discussed above, the intermediate buffer may be sized to hold all arguments passed to the native function. The system may map the intermediate buffer to system storage locations, such that each register of the system corresponds to a unique offset within the intermediate buffer.

For each argument included with the instruction to execute the native function, the system may execute the list of binding operators associated with that argument (Operation 804). Executing the list of binding operators may include loading the list of binding operators from the execution plan. The system may then read a first binding operator from the loaded list, and perform one or more operations based on the read operator (e.g., by interpreting the operator). Thereafter, the system may repeat this process, reading a next binding operator and interpreting the next binding operator to perform one or more operations based on the next binding operator, until a last binding operator of the list of binding operators has been interpreted.

As discussed above, interpreting one or more binding operators from the list of binding operators may cause the system to preprocess the arguments based on the method type, the function descriptor, and the selected ABI. For example, when the native function receives, as an argument, a memory address, the method may pass a MemoryAddress object. The list of binding operators for the memory address argument may include a box address operator for converting the MemoryAddress object into a 'long' value. Executing the box address binding operator (e.g., by interpreting the operator) may cause the system to pop a MemoryAddress argument from the operand stack, convert the MemoryAddress object to a 'long' value, and push the converted 'long' value to the operand stack.

Additionally, interpreting one or more binding operators from the list of binding operators may cause the system to move the associated argument to the intermediate buffer. For example, each argument component may include a move operator that specifies a storage location and an object type. The move operator moves the argument value to a specified offset within the intermediate buffer. When the system executes the move binding operator (e.g., by interpreting the operator), the system may pop a value having the specified type from the operand stack and move the popped value to the intermediate buffer at the offset associated with the register specified in the move operator.

The system may, in some embodiments, cause the arguments to be moved from the intermediate buffer to the system storage locations (Operation 806). In particular, the system may invoke an assembly routine to move data positioned by the execution plan in Operation 806 from the intermediate buffer to the system storage locations. The assembly routine may be selected based on a specified system ABI. In some embodiments, the ABI is specified by a user (e.g., in one or more code instructions).

The system may execute the native function (Operation 808). In some embodiments, the native function is executed based on the memory address associated with the invoked executable reference. In some embodiments, the native function operates on one or more values (e.g., parameters) passed to the native function, which are properly positioned based on the execution of the parameter components of the execution plan. The native function may produce data comprising a return value, and store the data in one or more system storage locations.

For each return value that is returned by the native function, the system may move the return value from the one or more system storage locations (Operation 810). As one example, the system may invoke an assembly routine to move data returned by the native function from the one or more system storage locations to the intermediate buffer. The assembly routine may be selected based on a specified system ABI. In some embodiments, the ABI is specified by a user (e.g., in one or more code instructions).

For each return value, the system may execute the list of binding operators of the return component of the selected execution plan (Operation 812). Executing the list of binding operators may include loading the list of binding operators from the execution plan. The system may then inspect the list of binding operators to determine a first binding operator from the loaded list, and perform one or more operations based on the determined operator (e.g., by interpreting the operator). Thereafter, the system may repeat this process, inspecting the list of binding operators to determine a next binding operator from the loaded list and interpreting the next binding operator to perform one or more operations based on the next binding operator, until a last binding operator of the list of binding operators has been interpreted.

Interpreting one or more binding operators from the list of binding operators of the return component may cause the system to move the associated return value from the intermediate buffer to the operand stack. For example, each return component may include a move operator that specifies an object type and a system storage location. The move operator may cause the system to move the argument value of the specified type from a specified offset within the intermediate buffer to the operand stack. When the system executes the move binding operator (e.g., by interpreting the operator), the system may load a value of the specified type from the intermediate buffer at the offset associated with the specified register, and push the loaded value to the operand stack.

As discussed above, interpreting one or more binding operators from the list of binding operators may cause the system to process the return value based on the method type, the function descriptor, and the selected ABI. For example, when the native function returns a memory address, the native function may return a 'long' value. However, the method may require a MemoryAddress object for compatibility. The return component of the execution plan may include a box address binding operator to convert the 'long' value to a MemoryAddress object. The system may execute the box address binding operator (e.g., by interpreting the operator) to pop the long value from the operand stack, convert the long value to a MemoryAddress object, and push the MemoryAddress object to the operand stack.

4.3 Specialized Execution Strategy

Execution of an invoked native function may be handled in a specialized way by the system. In particular, the system may compile the binding operators into a specialized invocation method.

Figure 9:
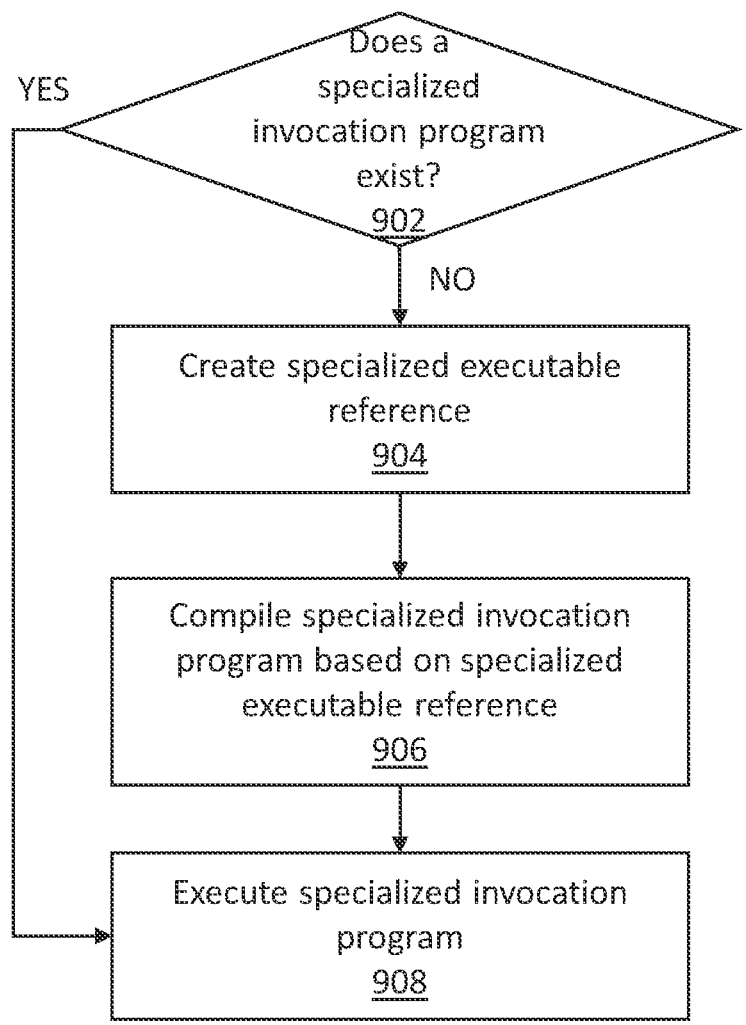
FIG. 9 illustrates a set of operations a specialized execution strategy for executing a native function using an executable reference in accordance with one or more embodiments.

FIG. 9 illustrates a flowchart showing techniques for a specialized execution strategy for executing a native function using an executable reference (e.g., a MethodHandle object). One or more operations illustrated in FIG. 8 may be modified, rearranged, or omitted all together. Accordingly, the particular sequence of operations illustrated in FIG. 8 should not be construed as limiting the scope of one or more embodiments.

The system may determine if a specialized invocation program exists for the particular native function (Operation 902). If no specialized invocation program has been created (NO in Operation 902), the system may create a specialized executable reference (e.g., a specialized MethodHandle object) for invoking the particular method (Operation 904). Creating the specialized executable reference may be completed based on the method type, the function descriptor, and the ABI descriptor.

The system may select a base executable reference that includes instructions to move each of the arguments to their associated system storage locations, and each of the return values from their associated system storage locations. The system may further specialize the base executable reference by pre-fixing or post-fixing the executable reference with operations that perform operations associated with other portions of the selected execution plan.

The system may create a specialized invocation program for the particular native function based on the specialized executable reference (Operation 906). The system may use a compiler (e.g., a Just In Time compiler) to create a special invocation program. The system may compile the instructions of the specialized executable reference to create the special invocation program. In embodiments, the specialized invocation program may be created in a language that allows access to the system storage locations.

In embodiments, the specialized invocation program is created based at least in part on the selected execution plan (e.g., because the instructions of the specialized executable reference are based on the selected execution plan). The specialized invocation program may preprocess the arguments based on the method type, the function descriptor, and the selected ABI. For example, when the native function receives, as an argument, a memory address, the method may pass a MemoryAddress object. The list of binding operators for the memory address argument may include a box address operator for converting the MemoryAddress object into a 'long' value. Accordingly, the specialized invocation program may include instructions derived from compiling instructions from the specialized executable reference which correspond to the box address binding operator. That is, the instructions of the specialized invocation program may, when executed, cause the system to pop a MemoryAddress argument from the operand stack, convert the MemoryAddress object to a 'long' value, and push the converted 'long' value to the operand stack.

Additionally, each argument component of the determined execution plan may include a move operator to move the specified argument to a specified system storage location so that the native function may make use of the argument value. Accordingly, the specialized invocation program may include instructions derived from compiling instructions from the specialized executable reference which correspond to the move binding operator. That is, the instructions of the specialized invocation program may, when executed, cause the system to pop a value having the specified type from the operand stack and move the popped value directly to the specified system storage location.

The specialized invocation program may cause the system to execute the particular native function. For each return value of the native function the specialized invocation program may move the return value from the system register in which the return value is stored to the memory accessible to the method. In particular, the return component of the execution plan may be compiled so that the returned values provided by the native function are processed. For example, each return component may include a move operator that specifies an object type and a system storage location. The specialized invocation method may compile instructions from the specialized executable reference which correspond to the binding operators so that, when executed, the specialized invocation program causes the system to move the argument value of the specified type from the specified system storage location to the operand stack. That is, the specialized invocation program may cause the system to load a value of the specified type from the specified system storage location, and push the loaded value to the operand stack.

The specialized invocation program may cause further processing of the return value. For example, when the native function returns a memory address, the native function may return a 'long' value. However, the method may require a MemoryAddress object for compatibility. The execution plan may include a box address binding operator to convert the 'long' value to a MemoryAddress object. Accordingly, the specialized invocation program may include instructions derived from compiling instructions from the specialized executable reference which correspond to the box address binding operator. That is, the instructions of the specialized invocation program may, when executed, cause the system to pop a long value from the operand stack, convert the long value to a MemoryAddress object, and push the MemoryAddress object to the operand stack.

After the specialized invocation program is created, or if the system determines that a special invocation program already exists (YES at Operation 902), the system may execute the specialized invocation program (Operation 908). In particular, execution of the specialized invocation program may replace execution of the executable reference.

5. EXECUTING A METHOD LINKED TO A NATIVE FUNCTION

In some cases, a user may desire to pass a reference to a method implemented in the second programming language (e.g., Java) to a native function implemented in the first programming language (e.g., C, C++, Pascal, etc.). In native code, it may be desirable to pass functions as data to other functions. For example, sorting algorithms may receive, as data a function that can be used to compare elements in an array or other data structure. Accordingly, it may be desirable to pass, to a native function, a pointer to a java method. As a particular example, a user may wish to pass, to a sorting algorithm implemented as a native function, a pointer to a Java method for use in comparing elements in an array.

5.1 Selecting an Execution Strategy

Figure 10:
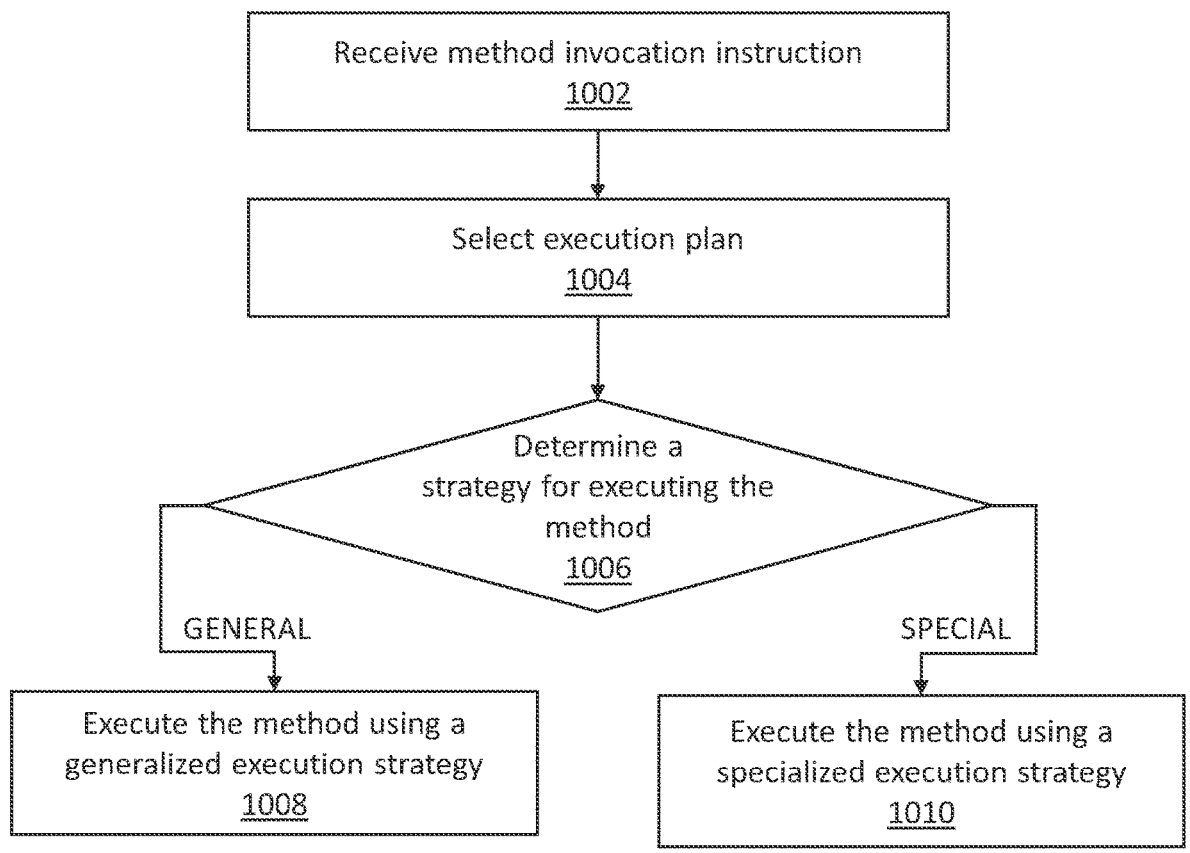
FIG. 10 illustrates a set of operations for selecting an execution strategy for executing method linked to a native function in accordance with one or more embodiments.

FIG. 10 illustrates a flowchart showing techniques for selecting an execution strategy for obtaining a memory address for corresponding to an entry point of a method (e.g., a MemoryAddress object) to be used as a reference to the method. The memory address may be obtained directly from the method or from an executable method reference (e.g., a Java MethodHandle object). One or more operations illustrated in FIG. 10 may be modified, rearranged, or omitted all together. Accordingly, the particular sequence of operations illustrated in FIG. 10 should not be construed as limiting the scope of one or more embodiments.

The system may receive an instruction to invoke a method implemented in a second programming language (Operation 1002). The request may be received in the form of a method call made via a pointer (e.g., a memory address) to a specified method. The method call may include, among other things, a function descriptor, a method type, an ABI descriptor, and a memory address associated with the native function.

The system may select an execution plan associated with the particular method (Operation 1004). In aspects, the system selects the execution plan on the basis of the function descriptor, the method type, and the ABI descriptor.

The system may determine a strategy for executing the method (Operation 1006). In particular, the system may determine if the method should be executed by a generalized invocation strategy, or if the method should be executed by a specialized invocation strategy. One or more criteria may be used to determine the strategy for executing the method.

One criterion for determining the strategy for executing the method can be a number of times the method is invoked. For example, the system can determine a number of times that the method is invoked and compare that to a threshold. In some embodiments, the threshold may be 10, 100, 1000, 10,000, or any other number deemed suitable by the system. The system may determine whether or not the number of times the method is invoked exceeds the threshold.

Another criterion for determining a strategy for executing the method may be constancy of the invocations of the method. In embodiments, the system determines that the argument types and/or return types of the method are not changing (e.g., so that the function descriptor, method type, and ABI descriptor are the same in each invocation). For example, the system may detect that the method is immutable. As another example, the system may detect that the method is invoked as a part of a loop that does not alter the method call.

Still another criterion for determining a strategy for executing the method may be complexity. That is, the system may determine that one or more features of the method are not supported by (or are difficult to support using) one execution strategy.

The system may determine the process for executing the method based on one or more of these criteria. Additionally, one of skill in the art may recognize that more or different criteria may be used in determining the process for executing the method.

In response to the system determining that the method should be executed using a generalized execution strategy (GENERAL at Operation 1006), the system may invoke the method by interpreting the binding operators (Operation 1008). Alternatively, in response to the system determining that the method should be executed using a specialized execution strategy (SPECIAL at Operation 1006), the system may invoke the method by compiling the binding operators into a specialized execution strategy (Operation 1010). The compiled specialized execution strategy may be invoked in place of executing the code at the received memory address.

5.2 Generalized Execution Strategy

Execution of an invoked method may be handled in a generalized way by the system. In particular, the system may use an interpreter to interpret the binding operators of the execution plan.

Figure 11:
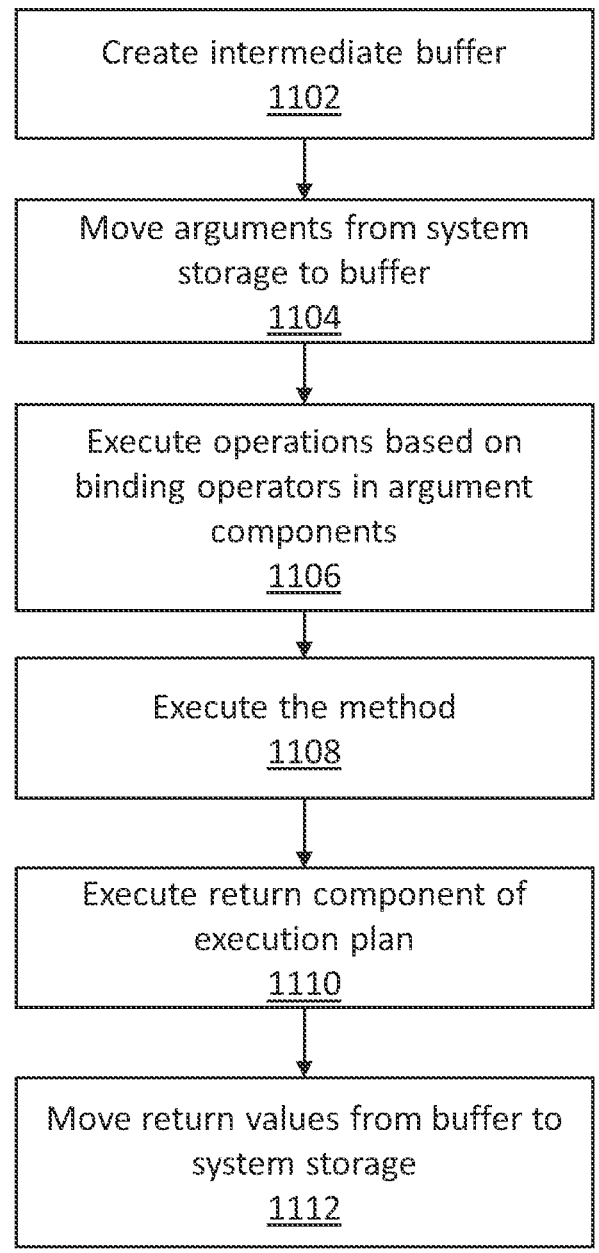
FIG. 11 illustrates a set of operations for a generalized execution strategy for executing method linked to a native function in accordance with one or more embodiments.

FIG. 11 illustrates a flowchart showing techniques for a generalized execution strategy for executing a linked method. One or more operations illustrated in FIG. 11 may be modified, rearranged, or omitted all together. Accordingly, the particular sequence of operations illustrated in FIG. 11 should not be construed as limiting the scope of one or more embodiments.

The system may allocate an intermediate buffer for use in marshalling arguments for the method (Operation 1102). As discussed above, the intermediate buffer may be sized to hold all arguments passed to the native function. The system may map the intermediate buffer to system storage locations, such that each register of the system corresponds to a unique offset within the intermediate buffer.

For each argument associated with the method, the system may cause the arguments to be moved from the system storage locations to the intermediate buffer (Operation 1104). In particular, the system may invoke an assembly routine to move data positioned in storage location (e.g., system registers) by executing native code to the intermediate buffer. The assembly routine may be selected based on a specified system ABI. In some embodiments, the ABI is specified by a user (e.g., in one or more code instructions).

For each argument component of the determined execution plan, the system may execute the list of binding operators associated with that argument (Operation 1106). Executing the list of binding operators may include loading the list of binding operators from the execution plan. The system may then read a first binding operator from the loaded list, and perform one or more operations based on the read operator (e.g., by interpreting the operator). Thereafter, the system may repeat this process, reading a next binding operator and interpreting the next binding operator to perform one or more operations based on the next binding operator, until a last binding operator of the list of binding operators has been interpreted.

Interpreting the binding operators may cause the system to move the associated argument from the intermediate buffer to the operand stack for use by the method. For example, each argument component may include a VM load operator that specifies a storage location and an object type. The VM load operator moves the argument having a specified type from the specified offset within the intermediate buffer to the operand stack. When the system executes the VM load binding operator (e.g., by interpreting the operator), the system may load a value of the specified type from the specified storage location in the intermediate buffer and push that value to the operand stack.

As discussed above, interpreting one or more binding operators from the list of binding operators may cause the system to preprocess the arguments based on the method type, the function descriptor, and the selected ABI. For example, when the method receives, as an argument, a memory address, the method may require a MemoryAddress object. However, the function may provide a 'long' value as the memory address. The list of binding operators for the memory address argument may include a box address operator for converting the 'long' value to a MemoryAddress object. Executing the box address binding operator (e.g., by interpreting the operator) may cause the system to pop a 'long' value from the operand stack, convert the 'long' value to a MemoryAddress object, and push the MemoryAddress object to the operand stack.

The system may execute the method (Operation 1108). In some embodiments, the method operates on one or more values (e.g., arguments) passed to the method, which are properly positioned based on the execution of the argument components of the execution plan. The method may produce data comprising a return value.

For each return value, the system may execute the return component of the selected execution plan (Operation 1110). The return component of the execution plan may process the returned values provided by the method based on the method type, the function descriptor, and the selected ABI. Executing the list of binding operators associated with the return component may include loading the list of binding operators from the execution plan. The system may then read a first binding operator from the loaded list, and perform one or more operations based on the read operator (e.g., by interpreting the operator). Thereafter, the system may repeat this process, reading a next binding operator and interpreting the next binding operator to perform one or more operations based on the next binding operator, until a last binding operator of the list of binding operators has been interpreted.

In embodiments, interpreting one or more binding operators causes the system to process the return value. For example, when the method returns a memory address, the method may return a MemoryAddress object. However, the native function which called the method may require a 'long' value for compatibility. The return component of the execution plan may include an unbox address binding operator to convert the MemoryAddress object to a 'long' value. The system may execute the unbox address binding operator (e.g., by interpreting the operator) to pop the MemoryAddress object from the operand stack, convert the MemoryAddress object to a 'long' value, and push the 'long' value to the operand stack.

Interpreting a binding operator of the return component may cause the system to move the return values to the intermediate buffer. For example, each return component may include a VM store operator that specifies an object type and a system storage location. The VM store operator may cause the system to move the argument value of the specified type from the operand stack to a specified offset within the intermediate buffer. When the system executes the VM store binding operator (e.g., by interpreting the operator), the system may pop a value of the specified type from operand stack and store the value to at the offset associated with the specified register.

For each return value that is returned by the native function, the system may move the return value from the intermediate buffer to one or more system storage locations (Operation 1112). As one example, the system may invoke an assembly routine to move data returned by the method from the intermediate buffer to one or more system storage locations. The assembly routine may be selected based on a specified system ABI. In some embodiments, the ABI is specified by a user (e.g., in one or more code instructions).

5.3 Specialized Invocation Process

Execution of an invoked method may be handled in a specialized way by the system. In particular, the system may compile the binding operators into a specialized invocation process.

Figure 12:
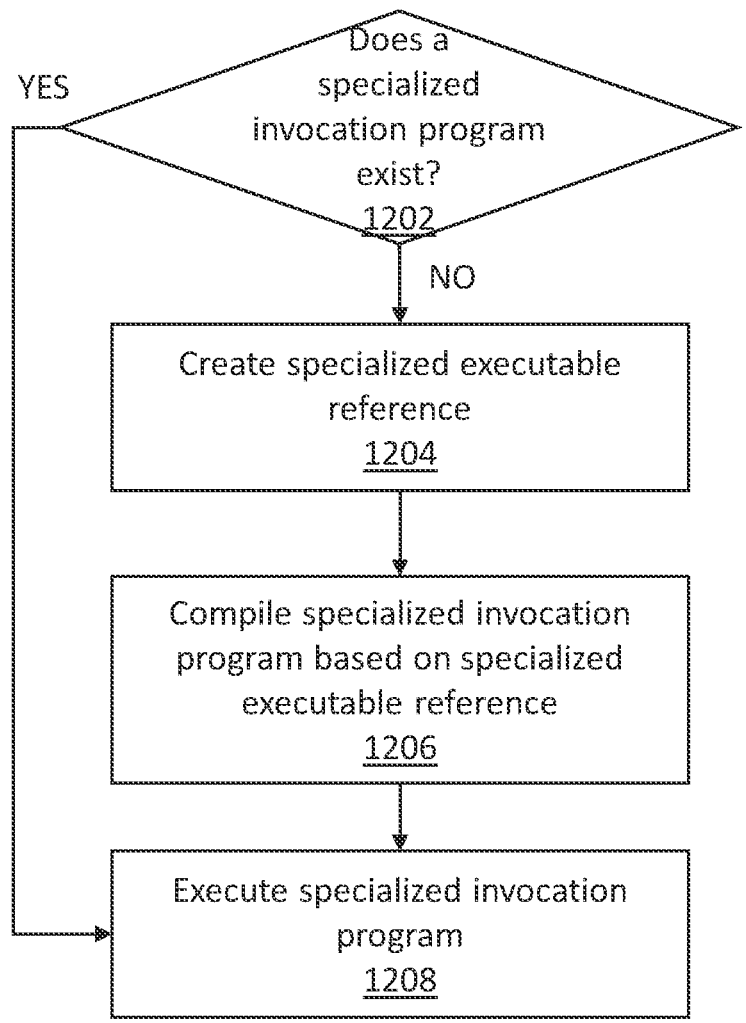
FIG. 12 illustrates a set of operations for a specialized execution strategy for executing method linked to a native function in accordance with one or more embodiments.

FIG. 12 illustrates a flowchart showing techniques for a specialized execution method for executing a linked method. One or more operations illustrated in FIG. 12 may be modified, rearranged, or omitted all together. Accordingly, the particular sequence of operations illustrated in FIG. 12 should not be construed as limiting the scope of one or more embodiments.

The system may determine if a specialized invocation program exists for the particular method (Operation 1202). If no specialized invocation program has been created (NO in Operation 1202), the system may create a specialized executable reference for invoking the particular method (Operation 1204). Creating the specialized executable reference may be completed based on the method type, the function descriptor, and the ABI descriptor.

The system may select a base executable reference that includes instructions to move each of the arguments to their associated system storage locations, and each of the return values from their associated system storage locations. The system may further specialize the base executable reference by pre-fixing or post-fixing the executable reference with operations that perform operations associated with other portions of the selected execution plan.

The system may create a specialized invocation program for the particular method based on the specialized executable reference (Operation 1206). The system may use a compiler (e.g., a Just In Time compiler) to create the specialized invocation program. The system may compile the instructions of the specialized executable reference to create the specialized invocation program. In embodiments, the specialized invocation program may be created in a language that allows access to the system storage locations.

The specialized invocation program may move each argument to the operand stack. In particular, each argument component of the execution plan may include a VM load operator to move the specified argument from a specified system storage location to the operand stack so that the method may make use of the argument value. Accordingly, the specialized invocation program may include instructions derived from compiling instructions of the specialized executable reference which correspond to the VM load binding operator. That is, the instructions of the specialized invocation program may, when executed, cause the system to load a value having the specified type directly from the specified system storage location and push the loaded value to the operand stack.

Additionally, the specialized execution program may process the argument values. For example, the method may receive, as an argument, a MemoryAddress object, while the native function may pass a memory address formatted as a 'long' value. The list of binding operators for the memory address argument may include a box address operator for converting the 'long' value to a MemoryAddress object. Accordingly, the specialized invocation program may include instructions derived from compiling instructions of the specialized executable reference which correspond to the box address binding operator. That is, the instructions of the specialized invocation program may, when executed, cause the system to pop a 'long' argument from the operand stack, convert the 'long' value to a MemoryAddress object, and push the converted MemoryAddress object to the operand stack.

The specialized invocation program may cause the system to execute the particular method. For each return value of the method the specialized invocation program may process the return value. For example, the method may return a memory address as a MemoryAddress object, while the native function requires memory address formatted as a 'long' value. The execution plan may include an unbox address binding operator to convert the MemoryAddress object to a 'long' value. Accordingly, the specialized invocation program may include instructions derived from compiling instructions of the specialized executable reference which correspond to the unbox address binding operator. That is, the instructions of the specialized invocation program may, when executed, cause the system to pop a MemoryAddress object from the operand stack, convert the MemoryAddress object to a 'long' value, and push the 'long' value to the operand stack.

The specialized invocation program may move the return value from the operand stack directly to one or more system storage locations for use by the native function. For example, each return component may include a VM store operator that specifies an object type and a system storage location. The specialized invocation program may include instructions derived from compiling instructions of the specialized executable reference which correspond to the VM store operator to produce instructions that, when executed, cause the system to move the argument value of the specified type from the operand stack to the specified system storage location. That is, the specialized invocation program may cause the system to pop a value of the specified type from the operand stack and store the popped value at the specified system storage location.

After the specialized invocation program is created, or if the system determines that a special invocation program already exists (YES at Operation 1202), the system may execute the specialized invocation program (Operation 1208). In particular, execution of the specialized invocation program may replace execution of the method indicated by the method pointer received in Operation 1002.

6. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
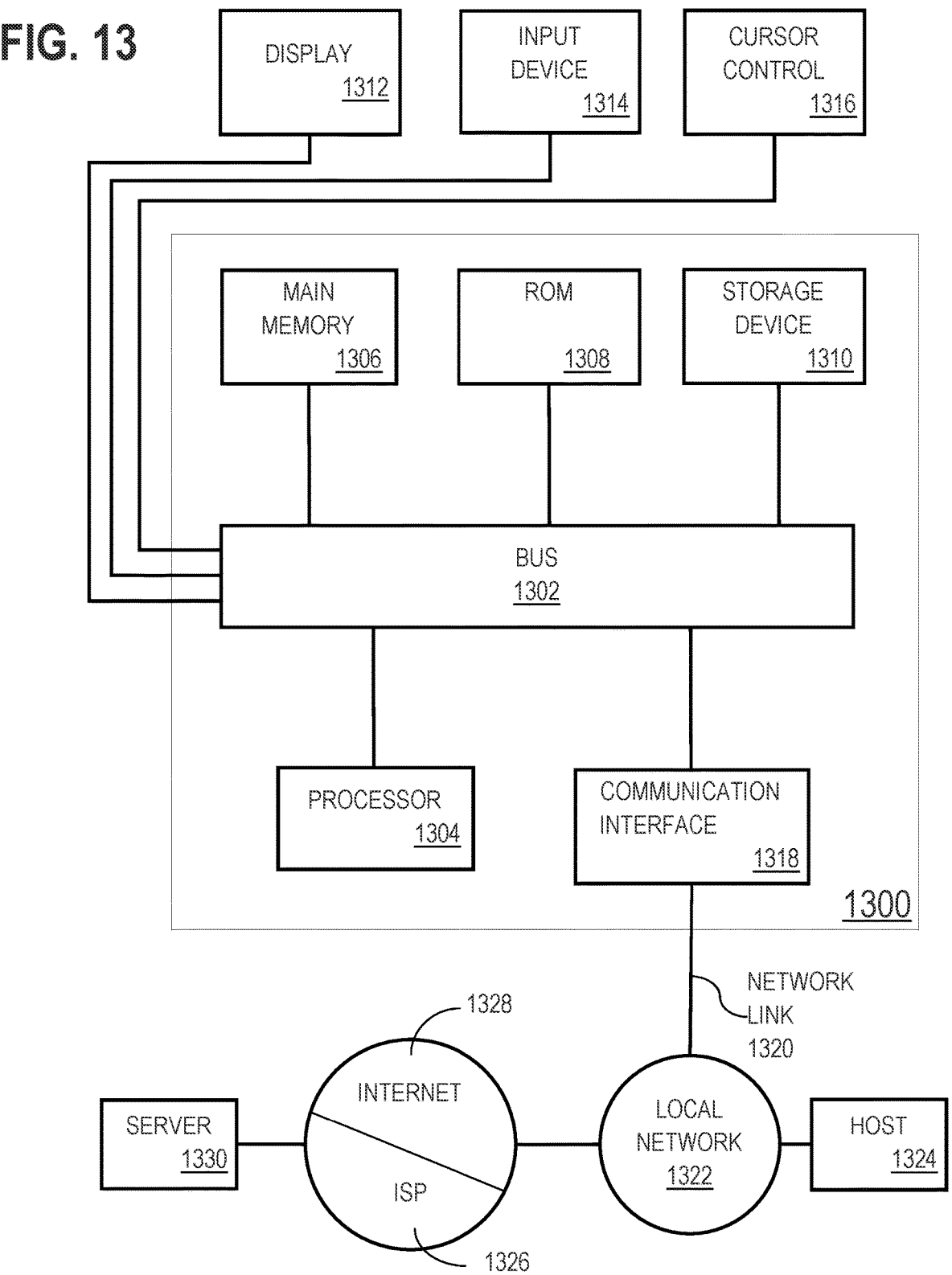
FIG. 13 illustrates a system in accordance with one or more embodiments.

For example, FIG. 13 is a block diagram that illustrates a computer system 1300 upon which an embodiment of the invention may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic, or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic, or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
   receiving a method invocation instruction for invoking, from a function compiled from a first programming language, a particular method compiled from a second programming language, the method invocation instruction comprising a function descriptor, a method type, and an application binary interface (ABI) descriptor, wherein the function descriptor includes a memory layout corresponding to any data returned by the function and memory layouts corresponding to each argument for the particular method;
   selecting an ABI for processing the particular method based on the received ABI descriptor;
   associating each argument with a corresponding particular physical register into which the argument is to be loaded, wherein the particular register is selected based on at least the selected ABI and the function descriptor;
   causing a virtual machine to load each argument into the corresponding associated physical register;
   invoking the particular method using at least one argument stored in the corresponding associated physical register.

2. The one or more media of claim 1, further comprising:
   determining that the particular method can be processed using a specialized processing program,
   wherein the specialized processing program causes the virtual machine to load each argument directly to the corresponding associated physical register.

3. The one or more media of claim 2, wherein determining that the particular method can be processed using the specialized processing program comprises determining that the particular method is not being altered.

4. The one or more media of claim 2, wherein determining that the particular method can be processed using the specialized processing program comprises determining that a number of times the method is being invoked exceeds a threshold.

5. The one or more media of claim 2, the operations further comprising:
   determining that no specialized processing program exists for the particular method;
   responsive to determining that no specialized processing program exists for the particular method: creating a specialized processing program for the particular method based on the method type, the function descriptor, and the ABI descriptor.

6. The one or more media of claim 1, further comprising:
   receiving a second method invocation instruction for invoking a second method, the second method invocation instruction comprising one or more arguments and a function descriptor comprising a memory layout corresponding to data returned by the function and one or more memory layouts each corresponding to the one or more arguments;
   selecting a second ABI for processing the second method;
   determining that the second method cannot be processed using a special processing program;
   in response to determining that the second method cannot be processed using the special processing program:
      creating a buffer sized to store at least the one or more arguments;
      moving the one or more arguments into the buffer, wherein a location for each argument is selected based on the function descriptor of the second method invocation instruction and the second ABI;
      associating each location of the buffer with a corresponding physical register;
      causing the virtual machine to load each of the one or more arguments from the buffer into the corresponding associated physical register.

7. The one or more media of claim 1, wherein the particular method is a native method and wherein executing the instructions further causes processing the one or more arguments to convert the one or more arguments to one or more translated arguments.

8. A method, comprising:
   receiving a method invocation instruction for invoking, from a function compiled from a first programming language, a particular method compiled from a second programming language, the method invocation instruction comprising a function descriptor, a method type, and an application binary interface (ABI) descriptor, wherein the function descriptor includes a memory layout corresponding to any data returned by the function and memory layouts corresponding to each argument for the particular method;
   selecting an ABI for processing the particular method based on the received ABI descriptor;
   associating each argument with a corresponding particular physical register into which the argument is to be loaded, wherein the particular register is selected based on at least the selected ABI and the function descriptor;
   causing a virtual machine to load each argument into the corresponding associated physical register;
   invoking the particular method using at least one argument stored in the corresponding associated physical register;
   wherein the method is performed by at least one device including a hardware processor.

9. The method of claim 8, further comprising:
   determining that the particular method can be processed using a specialized processing program,
   wherein the specialized processing program causes the virtual machine to load each argument directly to the corresponding associated physical register.

10. The method of claim 9, wherein determining that the particular method can be processed using the specialized processing program comprises determining that the particular method is not being altered.

11. The method of claim 9, wherein determining that the particular method can be processed using the specialized processing program comprises determining that a number of times the method is being invoked exceeds a threshold.

12. The method of claim 9, further comprising:
determining that no specialized processing program exists for the particular method;
responsive to determining that no specialized processing program exists for the particular method: creating a specialized processing program for the particular method based on the method type, the function descriptor, and the ABI descriptor.

13. The method of claim 8, further comprising:
receiving a second method invocation instruction for invoking a second method, the second method invocation instruction comprising one or more arguments and a function descriptor comprising a memory layout corresponding to data returned by the function and one or more memory layouts each corresponding to the one or more arguments;
selecting a second ABI for processing the second method;
determining that the second method cannot be processed using the special processing program;
in response to determining that the second method cannot be processed using the reduced special processing program:
creating a buffer sized to store at least the one or more arguments;
moving the one or more arguments into the buffer, wherein a location for each argument is selected based on the function descriptor of the second method invocation instruction and the second ABI;
associating each location of the buffer with a corresponding physical register;
causing the virtual machine to load each of the one or more arguments from the buffer into the corresponding associated physical register.

14. The method of claim 8, wherein the particular method is a native method and wherein executing the instructions further causes processing the one or more arguments to convert the one or more arguments to one or more translated arguments.

15. A system comprising:
at least one device including a hardware processor;
the system being configured to perform operations comprising:
receiving a method invocation instruction for invoking, from a function compiled from a first programming language, a particular method compiled from a second programming language, the method invocation instruction comprising a function descriptor, a method type, and an application binary interface (ABI) descriptor, wherein the function descriptor includes a memory layout corresponding to any data returned by the function and memory layouts corresponding to each argument for the particular method;
selecting an ABI for processing the particular method based on the received ABI descriptor;
associating each argument with a corresponding particular physical register into which the argument is to be loaded, wherein the particular register is selected based on at least the selected ABI and the function descriptor;
causing a virtual machine to load each argument into the corresponding associated physical register;
invoking the particular method using at least one argument stored in the corresponding associated physical register.

16. The system of claim 15, further comprising:
determining that the particular method can be processed using a specialized processing program,
wherein the specialized processing program causes the virtual machine to load each argument directly to the corresponding associated physical register.

17. The system of claim 16, wherein determining that the particular method can be processed using the specialized processing program comprises determining that the particular method is not being altered.

18. The system of claim 16, wherein determining that the particular method can be processed using the specialized processing program comprises determining that a number of times the method is being invoked exceeds a threshold.

19. The system of claim 15, further comprising:
receiving a second method invocation instruction for invoking a second method, the second method invocation instruction comprising one or more arguments and a function descriptor comprising a memory layout corresponding to data returned by the function and one or more memory layouts each corresponding to the one or more arguments;
selecting a second ABI for processing the second method;
determining that the second method cannot be processed using the special processing program;
in response to determining that the second method cannot be processed using the reduced special processing program:
creating a buffer sized to store at least the one or more arguments;
moving the one or more arguments into the buffer, wherein a location for each argument is selected based on the function descriptor of the second method invocation instruction and the second ABI;
associating each location of the buffer with a corresponding physical register;
causing the virtual machine to load each of the one or more arguments from the buffer into the corresponding associated physical register.

20. The system of claim 15, wherein the particular method is a native method and wherein executing the instructions further causes processing the one or more arguments to convert the one or more arguments to one or more translated arguments.

* * * * *